Figure 1:
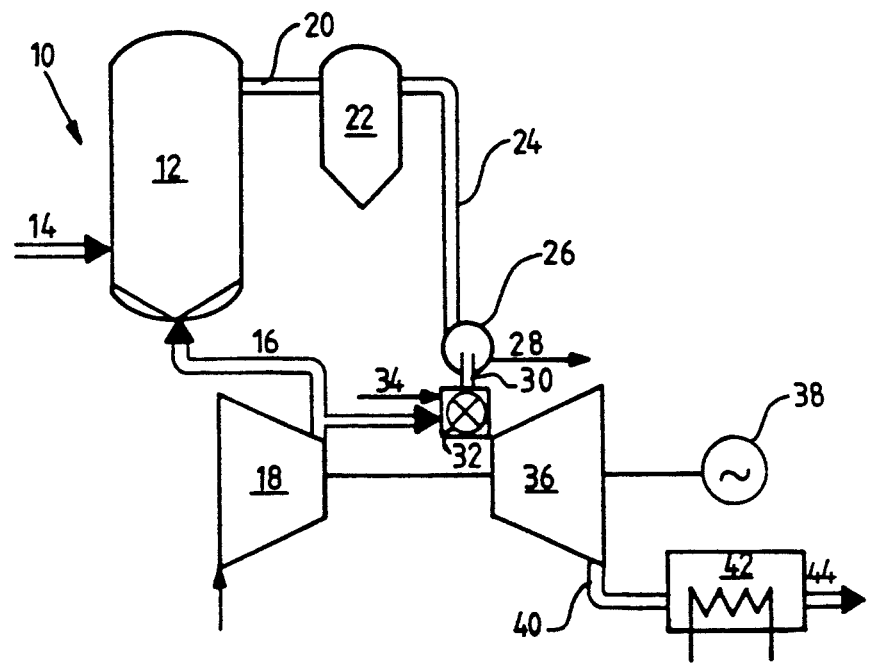

United States Patent [19]

Nieminen

[11] Patent Number: 5,272,866
[45] Date of Patent: Dec. 28, 1993

[54] METHOD AND APPARATUS FOR TREATING GASES FROM GASIFICATION OR COMBUSTION PLANTS

[75] Inventor: Jorma J. Nieminen, Varkaus, Finland

[73] Assignee: A. Ahlstrom Corporation, Noormarkku, Finland

[21] Appl. No.: 867,668

[22] PCT Filed: Dec. 21, 1990

[86] PCT No.: PCT/FI90/00310

§ 371 Date: Jul. 6, 1992

§ 102(e) Date: Jul. 6, 1992

[87] PCT Pub. No.: WO91/10053

PCT Pub. Date: Jul. 11, 1991

[30] Foreign Application Priority Data

Jan. 4, 1990 [FI] Finland ............ 900031

[51] Int. Cl.$^5$ ............ F02G 3/00; B01D 45/12
[52] U.S. Cl. ............ 60/39.02; 60/39.092; 60/39.464; 110/264; 55/459.1; 55/460
[58] Field of Search ............ 60/39.02, 39.092, 39.12, 60/39.464; 110/264; 55/459.1, 460

[56] References Cited

U.S. PATENT DOCUMENTS

| | | | |
|---|---|---|---|
| 2,616,252 | 11/1952 | Robinson et al. | 60/39.464 |
| 4,059,415 | 11/1977 | Kosaka et al. | 60/39.464 |
| 4,089,631 | 5/1978 | Giles | 60/39.464 |
| 4,539,918 | 9/1985 | Beer et al. | 60/39.464 |
| 4,569,194 | 2/1986 | Giles et al. | 60/39.02 |
| 4,600,414 | 7/1986 | Metcalfe et al. | 60/39.464 |
| 4,697,413 | 10/1987 | Pohl | 60/39.02 |
| 4,779,412 | 10/1988 | Deinert | 60/39.02 |
| 5,024,170 | 6/1991 | Santanam et al. | 110/264 |
| 5,148,669 | 9/1992 | Sellakumar | 60/39.092 |
| 5,165,236 | 11/1992 | Nieminen | 60/39.464 |

FOREIGN PATENT DOCUMENTS 604884 11/1989 Australia .
223619 5/1987 European Pat. Off. .

*Primary Examiner*—Richard A. Bertsch
*Assistant Examiner*—Howard R. Richman
*Attorney, Agent, or Firm*—Nixon & Vanderhye P.C.

[57] ABSTRACT

Method and apparatus for treating gases issuing from a pressurized gasification or combustion plant of solid fuel prior to leading the gases into a turbine. The hot gases are first cleaned in a particle separator, whereafter they are introduced int a centrifugal separator, which is disposed immediately in front of or in connection with a combustion chamber of the turbine. Cleanliness of the gases is ensured by the centrifugal separator. Air is mixed with the gases for bringing about additional combustion and for raising the temperature of the gases to a level >1000° C.

16 Claims, 4 Drawing Sheets

METHOD AND APPARATUS FOR TREATING GASES FROM GASIFICATION OR COMBUSTION PLANTS

The present invention relates to a method of treating process or flue gases issuing from a pressurized gasification or combustion plant immediately prior to leading such gases into an expansion turbine. Especially, it relates to a method of treating gases cleaned in one or more particle separators and of leading such gases into a turbine via a combustion chamber of the turbine.

By connecting a gas turbine to a solids gasification or combustion plant, it is possible to produce energy with a wide range of fuels. Besides coal, also peat, wood, bark as well as other waste material are applicable fuels. Also in view of emissions, connecting a gasification process to a gas turbine is an advantageous solution in comparison with conventional steam power plants.

In order to prevent fast wearing of the gas turbine vanes, all particles have to be carefully separated from the gases before the gases reach the turbine vanes. Even very small particles wear the vanes in a short time, causing disturbances to the drive of the turbine. Large particles may destroy the turbine altogether in no time. Therefore, the gases are carefully cleaned in particle separators prior to leading them into the combustion chamber of the gas turbine and further to the turbine vanes.

However, particle separators may sometimes function dissatisfactorily or they may abruptly be damaged so that particles escape and, entrained in clean gas, flow into the turbine. In e.g. ceramic filters, there may emerge cracks, wherethrough fine particulate material, entrained in clean gas, enters the turbine unnoticed.

If the gas duct is provided with refractory lining, fine particulate material or even larger particles of refractory material may become loose and be entrained into the gas flow. Large pieces of refractory material may destroy the turbine completely in no time.

Preventing and foreseeing of the aforesaid damages has been difficult These damages are disastrous for the turbine. Fine particles wear the outer edges of the turbine vanes and large particles may destroy the vanes completely as soon as they reach the vanes.

The gas duct leading to the turbine may be manufactured of steel resistant to hot gas, thereby avoiding the drawbacks caused by refractories Normal steel does not, however, endure hot flue gases without cooling. Cooling of gas before the turbine is, however, disadvantageous in terms of energy economy. The hotter the gases are when led into the turbine the better is the result.

Special, heat-resistant metals may naturally be used in the flue gas duct, but they raise the cost considerably. Cost aspects are important, especially, if flue gases have to be transported long distances.

This problem, namely ensuring the cleanliness of seemingly clean gas immediately before the combustion chamber of the turbine has neither been interfered nor solved so far.

Gases containing particulate material or ash have been cleaned prior to feeding them into the gas turbine. It has been suggested, for example, that the gas issuing from the gasifier should be burned right away in the combustion chamber of the turbine and that the flue gases should not be cleaned until immediately before the turbine in a super cyclone. However, this procedure sets high demands on the cyclone because the gases have to be completely cleaned in only one stage so that no wearing particles remain in the gas flowing into the turbine.

The temperature of the gas to be introduced into the gas turbine should be as even as possible and preferably >1000° C. in order to receive a high yield from the combustion process. The quality of the gas, even from the process of the same plant may, however, vary greatly depending on, e.g. the loading of the plant.

The yield of the gas could be raised by topping combustion, i.e. additional combustion in the combustion chamber. However, in the combustion stage and thereafter, when introduced into the turbine, the very hot >1000° C. gas requires equipment which is either of refractory material or cooled or manufactured of special metals. It has not been possible to use refractory constructions because particulate material or even larger pieces may become loose thereof. Special metals are expensive and, therefore, due to cost reasons they are out of the question in large equipment.

Generally speaking, the only alternative has therefore been cooled equipment Means used for treatment of hot gas have usually been cooled by supplying cooling air or other gas and making it flow along the inner surfaces of such means. In this way, excessive cold gas has been brought into the turbine. However, this is not advantageous in view of the yield of the turbine.

An object of the present invention is to provide a novel method and apparatus for enabling even feed of hot and clean gas into the turbine.

Another object of the invention is to enable the use of low-cost material such as refractories in the gas inlet duct.

A further object of the invention is, according to an embodiment of the invention, to enable the use of the gases from gasification or combustion plants in such a manner that the gases need not substantially be diluted by means of cooling gases.

The method according to the invention is characterized in that the gases issuing from the particle separator are introduced, at a temperature of approx. 150° to 950° C., into a centrifugal separator, which is disposed in the gas duct in front of or in connection with the combustion chamber of the turbine, cleanliness of the gases before the turbine is ensured by introducing the gases into the centrifugal separator so as to quickly detect possible leakage of particulate material caused by the particle separator in case it is damaged or so as to be able to separate coarser particles or pieces, coming from the gas duct or elsewhere, from the gas in order to prevent such particles or pieces from destroying the gas turbine and that air or other oxygen-containing gas and possibly additional fuel is mixed with the combusting gases in the combustion chamber of the turbine in order to bring about combustion and to raise the temperature to a level >1000° C.

The apparatus according to the invention is characterized in that in front of the turbine is disposed a combustion chamber where it is possible to raise the temperature of the gases to a level >1000° C. and that in connection with or immediately before the combustion chamber of the turbine, a centrifugal separator is disposed for removing particulate material or coarser particles, possibly remained in the gases after the gas cleaning means, prior to introducing the gas into the turbine.

In accordance with a preferred embodiment of the invention, the gases are conducted from the particle separators in a mainly uncooled gas duct into a mainly uncooled centrifugal separator, where the cleanliness of the gases is ensured prior to introducing them into the turbine.

In accordance with an embodiment of the invention, the combustion chamber of the turbine is also mainly uncooled, whereby the gases are heated to a desired temperature without using any diluting cooling gases.

In accordance with a preferred embodiment of the invention, both the gas duct, the combustion chamber and the centrifugal separator may be of refractory construction if the centrifugal separator is so disposed as to prevent particles, which have possibly become loose of the refractories and which now are present in the combustion chamber, from entering the turbine.

In accordance with the invention, it is possible to continuously lead a small gas flow out of the centrifugal separator from such an area thereof, whereto centrifugal force and possibly gravity leads the heavier fraction contained in the gas flow. If particles are brought into gases by accident from, e.g. a leaking particle separator, or if particulate material becomes loose of the refractory lining of the gas duct, these particles are accumulated in a small gas flow to be led out. In case of a leak, this small gas flow will contain proportionally much more particles than the actual main gas flow. Thus, a filter leak is easily detected by metering devices disposed in the small gas flow in the arrangement according to the invention. It would be difficult to detect small amounts of particulate material by means of a metering device in the actual main gas flow in the gas duct. In the small gas flow, where particles contained in the gas have been accumulated by means of centrifugal force, the particle density is so high that the particles are easily detected by a metering device.

The small gas flow discharged from the centrifugal separator may be joined to the main gas flow after the turbine and be introduced e.g. into a waste heat boiler, whereby the energy of the small gas flow can be recovered.

In accordance with a preferred embodiment of the invention, the centrifugal separator is connected to the combustion chamber of the turbine to serve as a multifunction chamber. The centrifugal separator is preferably a horizontal cyclone, one end of which is provided with an axially disposed burner for topping combustion and the other end with a gas inlet duct to the turbine The construction of the multi-function chamber, i.e. the combined combustion chamber and horizontal cyclone, is preferably provided with refractory material, whereby the gas temperature may be raised to a level as high as >1200° C. The periphery of the horizontal cyclone may be provided with one or more pockets or particle traps, for leading out the small gas flow. The particles possibly carried into the gas accumulate onto the periphery of the cyclone and are conveyed into the pockets disposed on said periphery, wherefrom they are removable with the continuous small gas flow. The pockets are preferably so large that even larger refractory pieces remain therein, being incapable of entering the turbine, whereas the actual gas outlet at the bottom of the pocket may be very small.

The combustion chamber may also be connected to a flow-through cyclone in order to ensure the cleanliness of the gas. The flow-through cyclone is of vertical type, the gas being preferably conducted tangentially thereinto. The discharge of the gas is so arranged that the gas flows into a duct running axially through the bottom of the cyclone. The separated particles are accumulated on the bottom of the cyclone wherefrom they are removed either in batches or with a continuous small gas flow.

The method according to the invention enables a continous process, the yield of which is high irrespective of fluctuations in the gas quality. Constructions of refractory material enable topping combustion, whereby the temperature of the gas to be introduced into the turbine can be regulated to a high and uniform level, even >1200° C.

A great advantage of the invention is naturally that less expensive materials may be used in the gas duct even after the particle filters Ducts with refractory lining may be employed. They are much cheaper than cooled metal ducts or ducts manufactured of special steels Furthermore, in view of the process, it is advantageous that the gases can be fed as hot as possible directly into the combustion chamber of the turbine without the need for precooling them.

Another great advantage of the invention is that by means of the centrifugal separator it is possible to provide a system which enables detection of even the slightest leakages in the filters Small leakages do not cause acute changes in the turbine vanes, but they, however, damage them in the long run, thereby causing adjusting problems, which results in that the leak is hard to detect. Worn vanes decrease the yield of the gas turbine.

It is, of course, especially advantageous that access of really big, harmful particles to the turbine vanes is prevented according to the invention Great damages destroying the whole turbine are thus avoided.

Figure 2:
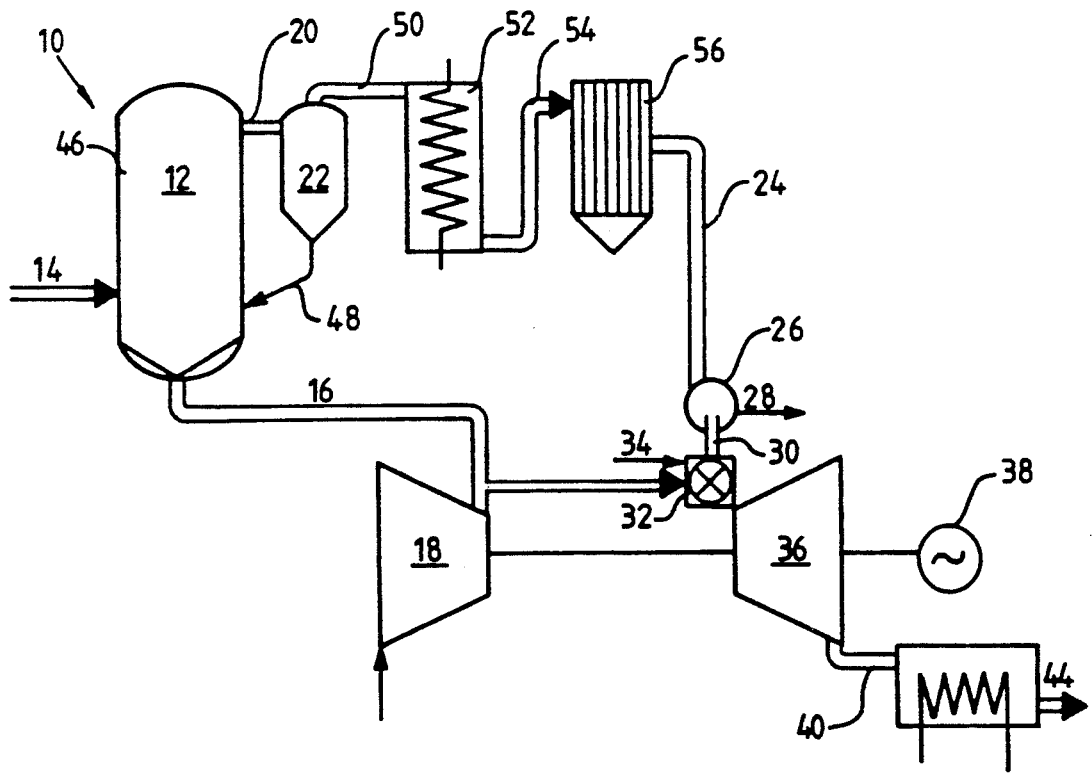
Figure 3:
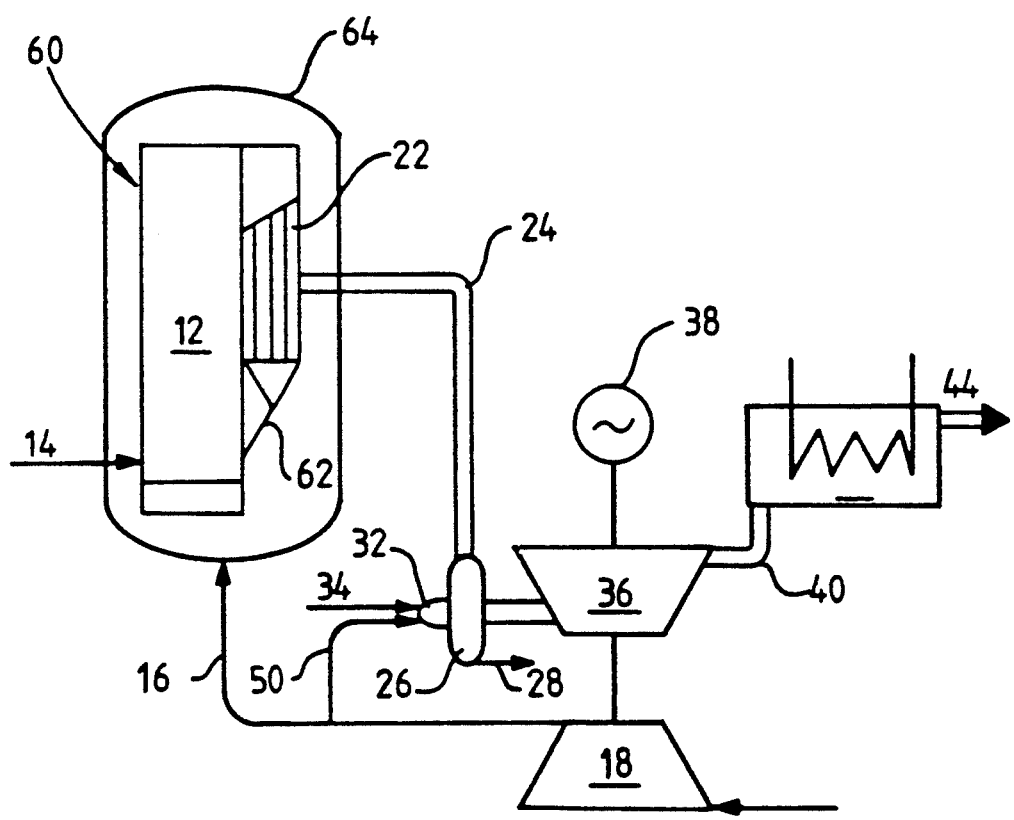
Figure 5:
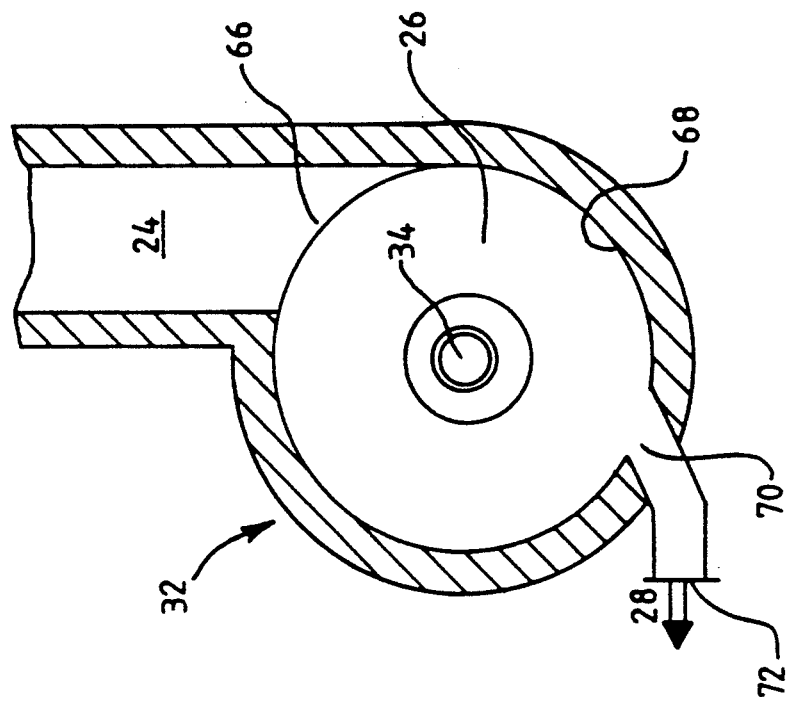
Figure 4:
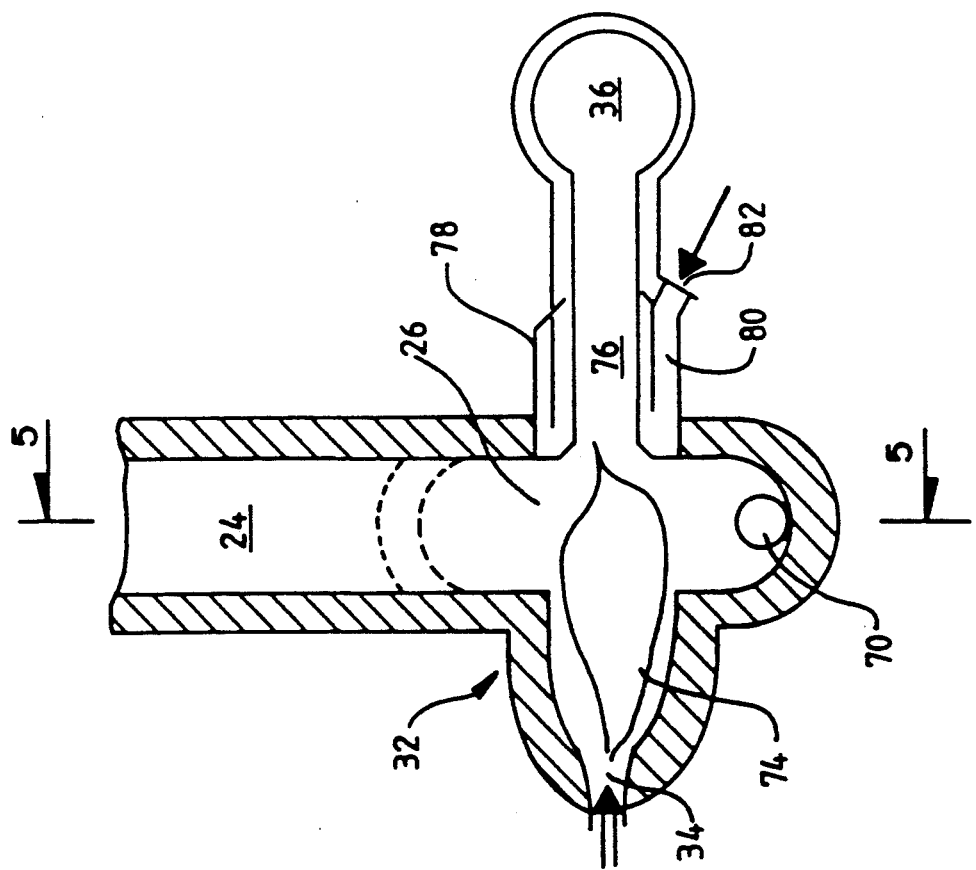
Figure 6:
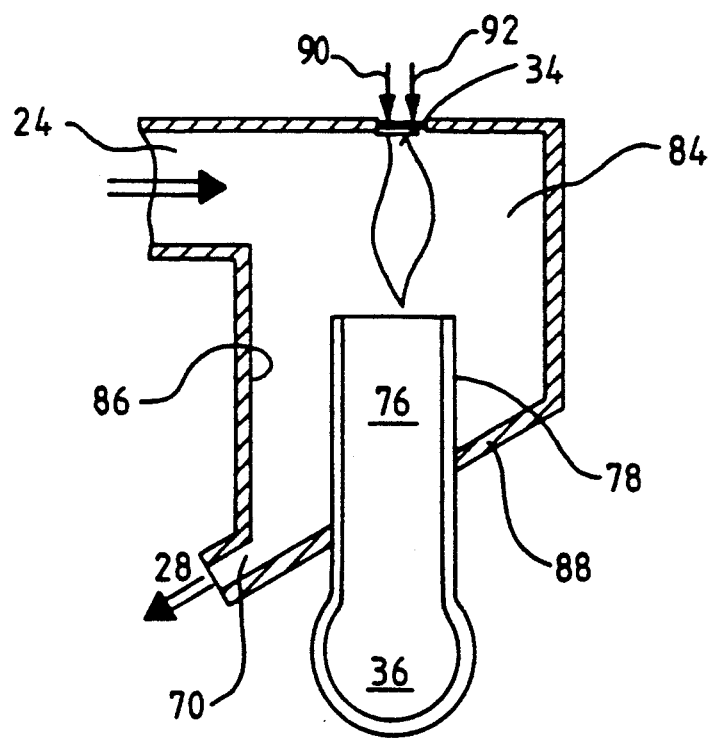

The invention will be described in more detail in the following, by way of example, with reference to the accompanying drawings, in which FIG. 1 is a schematic illustration of a gasification plant according to the invention, FIG. 2 is a schematic illustration of a second gasification plant according to the invention, FIG. 3 is a schematic illustration of a pressurized combustion plant according to the invention, FIG. 4 is an enlarged schematic illustration of a combustion chamber of the turbine according to an embodiment of the invention, FIG. 5 is a sectional view of FIG. 4 taken along line A—A, and FIG. 6 is a schematic illustration of a combustion chamber of the turbine according to a second embodiment of the invention.

FIG. 1 shows a pressurized gasifier 10 comprising a reaction chamber 12 of refractory material, into which reaction chamber material to be gasified is introduced via a conduit 14 and air via a conduit 16 from a compressor 18. A temperature of about 850° to 1100° C., preferably of 950° C., is maintained in the gasifier. The gases containing $CO$, $H_2$, $CO_2$, $N_2$, $CH_4$ etc. and having been produced in the gasification are conducted from the upper part of the reaction chamber via a conduit 20 into a particle separator 22. The particle separator may be some effective hot-gas cleaner such as, for example, a ceramic filter or an electric filter. The gases are cleaned in a filter so that they can be introduced into the turbine without any risk of the turbine vanes being damaged. The gases are cleaned so that the amount of particles remaining in the cleaned gases is about 0.1 to 10 mg/kg of gas, preferably >3 mg/kg of gas. The maximum particle size is preferably less than 10 μm.

The cleaned gases are conducted from the filter via a gas duct 24 with refractory lining into a horizontal cyclone 26. The periphery of the horizontal cyclone is provided with one or more pockets and an outlet 28 for the small gas flow. Particles originating from the filter or the gas duct and being carried into the cleaned gas after the filter are accumulated in the pocket. The particles may be discharged either continuously or in batches via outlet 28.

The clean and combustible gases are further taken from the horizontal cyclone via a short duct 30 into a combustion chamber 32 of the turbine to be combusted therein, said combustion chamber being disposed in the immediate vicinity of the cyclone. A separate burner 34 is disposed in the combustion chamber The temperature of the clean gases produced from gasification gas in the combustion chamber can be maintained at the desired level by means of topping combustion i e. post-combustion. In post-combustion, gas from the gasifier or gaseous or fluid fuel coming to the burner from elsewhere can be combusted From the combustion chamber, hot gases are conducted into an expansion turbine 36. In the arrangement of FIG. 1, hot gas is conducted from the gasifier, directly from the filter into the centrifugal separator, and the gas is not essentially cooled. The combustion chamber and the short duct 30 have to be cooled or manufactured of special metals so as to endure the hot gas flowing therein.

The turbine 36 is connected to a generator 38. The gases are conducted from the turbine via a duct 40 into a waste heat boiler 42 and further via a conduit 44 out of the boiler.

FIG. 2 shows a second embodiment of the invention For equivalent items, the same reference numerals are used as in FIG. 1. An embodiment of FIG. 2 comprises a gasifier 10 in which the gasification reactor is a circulating fluidized bed reactor 46. The circulating fluidized bed reactor comprises a reaction chamber 12, a particle separator 22 and a return duct 48, said return duct connecting the lower part of the particle separator to the lower part of the the reaction chamber The reaction chamber of the circulating fluidized bed reactor is supplied with air or other fluidizing gas from compressor 18 via conduit 16 at such a high velocity that a great part of particles, present in the reaction chamber, is discharged with the gas from the upper part of the reaction chamber.

The gas/particle suspension is conducted from the reaction chamber into a particle separator 22, where most particles are separated and returned to the lower part of the reaction chamber by means of a return duct 48 Some conventional hot-gas separator such as a vertical cyclone can be used as a particle separator Clean gases are conducted from the particle separator via a conduit 50 further into a convection section 52 The gases coming from the reaction chamber at a temperature of >800° C. are cooled to appr. 150°-650° C., preferably to 450°-650° C., in the convection section.

From the convection section, the cooled gases are conducted via a conduit 54 to the final cleaning stage in a filter 56. The filter may be, for example, a ceramic filter or if allowed by the temperature of the gases, also a conventional hose filter The gases are cleaned so as to keep the amount of particles contained therein preferably at a level of <3 mg/kg of gas. The particle size is preferably less than 10 μm.

The clean gases are conducted, as shown in the embodiment of FIG. 1, further into a centrifugal separator 26 for ensuring that the gas does not contain particles harmful to the turbine vanes. If the gas temperature is lower than in the case of FIG. 1, less exacting steel grades may be used, for example, for duct 30. The gas is heated to a suitable temperature, preferably to 1000° C., in the combustion chamber of the turbine.

FIG. 3 shows a combustion plant according to the invention. After cleaning, the flue gases of this plant are fed into the gas turbine Parts equivalent to those in FIG. 1 have the same reference numerals.

FIG. 3 shows a pressurized fluidized bed reactor with a circulating bed. The reaction chamber 12 is in communication with a fuel feed conduit 14 and an inlet conduit 16 for air or other fluidizing gas. The upper part of the reactor is connected to a particle separator 22, which, in the embodiment of the FIG. 3, is a ceramic filter. A return duct 62 connects the lower part of the filter 22 to the lower part of the reaction chamber. A circulating fluidized bed reactor is disposed in a pressure vessel 64.

Cleaned gas is conducted from a filter 22 at a temperature of appr. 750° to 950° C., through a duct 24 with a refractory lining into a combustion chamber 32 of the turbine, which chamber is in communication with a horizontal cyclone 26. The burner is axially disposed in the horizontal cyclone as better shown in FIGS. 4 and 5.

Hot, cleaned gases are conducted tangentially into the horizontal cyclone 26 via an opening 66 on the periphery of the cyclone Because of centrifugal force, the particles possibly contained in the gas accumulate onto the periphery 68 of the cyclone and are conducted into a pocket or a particle trap 70 disposed on said periphery. The pocket has an opening 72, wherethrough the small gas flow is conducted either continuously or in batches out of the cyclone and further to a metering device so that the amount of particles contained in the gas flow can be established.

According to the invention, this multi-function chamber arrangement comprising the horizontal cyclone/combuston chamber is preferably of low-cost refractory construction. Particles possibly becoming loose of the refractory material are carried into the pocket 70. They are not conveyed into the turbine.

An actual combustion section 74 and a burner 34 are axially disposed in the horizontal cyclone. The burner supplies combustion air or some other combustion-maintaining gas and gaseous or fluid fuel into the middle of the cyclone in order to raise the temperature of the gas coming from the gas duct 24 into the cyclone preferably to a level of 1000° C. Heated and cleaned gas is fed via the turbine inlet duct into the turbine 36.

The turbine inlet duct, disposed after the horizontal cyclone, is preferably air-cooled as shown in the figure. Refractory material is not recommendable for the duct because, even if the duct is short, particulate material or larger pieces may become loose of the duct walls and destroy the turbine vanes when entering the turbine. The walls 78 of the short inlet duct are provided with air ducts 80 for cooling the walls with air. The air is supplied into the air ducts 80 via an opening 82 The inlet duct is short and does not require a great amount of air for maintaining the temperature of the walls 80 at a suitable level The short inlet duct may naturally be manufactured from heat-resistant special steel at a relatively low cost. By using indirect cooling, the gas entering the turbine need not be diluted by means of cooling gases.

FIG. 6 shows a combustion chamber 32 of the turbine, which combustion chamber is in communication with a flow-through cyclone 84 The gases are conducted tangentially from the gas duct 24 into the flow-through cyclone 84 functioning on the principle of a vertical cyclone separator. In the flow-through cyclone, the particles possibly contained in the gases are carried to the periphery 86 of the cyclone. The clean gases are conducted by centrifugal force into a turbine inlet duct 76 disposed in the middle of the cyclone and therefrom further into the turbine 36. Particles possibly contained in the gases fall onto the inclined bottom of the vertical cyclone and more specifically into a pocket or particle trap 70 disposed in the lowest point of said inclined bottom The small gas flow and, together therewith, the particles possibly contained in the gases may be discharged either continuously or in batches via an opening 28 in the pocket.

In the arrangement according to FIG. 6, the burner 34 is disposed in the upper part of the flow-through cyclone in such a manner that the burner flame is directed towards the opening of the turbine inlet duct 76, whereby the gases can be efficiently heated prior to feeding thereof into the turbine. The burner is provided with feed means for air 90 and additional fuel 92.

It is not intended to limit the invention to the embodiments described above, but it can be modified and applied within the inventive scope defined in the accompanying claims.

What is claimed is:

1. A method of treating process or flue gases issuing from pressurized gasification or combustion plants prior to expanding them in a gas turbine, whereby
   the process gases or flue gases are first cleaned in one or more particle separators and thereafter conducted, at a temperature of approx. 150°–950° C., through a gas duct into a combustion chamber, where the temperature of the gases is raised to a level >1000° C., by mixing air or other oxygen containing gas into the gases, prior to expansion in the gas turbine; characterized by the steps of:
   separating particles contained in the gases introduced into the combustion chamber by subjecting them to centrifugal force, rotating about an axis, so that the particles move to the periphery of the combustion chamber;
   discharging the separated particles from the periphery of the combustion chamber; and
   discharging from the combustion chamber, along said axis, the gases from which the particles have been separated.

2. A method as claimed in claim 1, characterized by the gases being first cleaned in a filter so as to make the amount of particles contained in the gases approx. 0.1 to 10 mg/kg gas, preferably <3 mg/kg gas.

3. A method as claimed in claim 1, characterized by the gases being conducted via an uncooled duct into the combustion chamber.

4. A method as claimed in claim 1, characterized by the combustion chamber being uncooled.

5. A method as claimed in claim 1, characterized by a small gas flow and particles possibly gathered therein being continuously discharged through an opening formed on the periphery of the combustion chamber.

6. A method as claimed in claim 5, characterized by the small gas flow discharged from the combustion chamber being joined with a gas flow discharged from the gas turbine.

7. An apparatus for treating gases issuing from pressurized gasification or combustion plants prior to expanding them in a gas turbine, including one or more particle separators, for cleaning the gases, and a combustion chamber, for raising the temperature of the cleaned gases to a level >1000° C. immediately in front of the gas turbine, the combustion chamber being connected by a gas duct to the one or more particle separators; wherein
   said combustion chamber is formed as a centrifugal separator, have an axis about which particles rotate, for removing particulate material contained in the cleaned gases introduced into the combustion chamber, and further comprising
   a pocket or an opening, for separated particulate material, provided on the periphery of the centrifugal separator, and an outlet for gases provided along said axis of said centrifugal separator.

8. An apparatus as claimed in claim 7, characterized by the combustion chamber being uncooled.

9. An apparatus as claimed in claim 8, characterized by the combustion chamber being refractory lined.

10. An apparatus as claimed in claim 7, characterized by the gas duct being uncooled.

11. An apparatus as claimed in claim 7, characterized by the gas duct being refractory lined.

12. An apparatus as claimed in claim 7, characterized by the centrifugal separator being a horizontal cyclone.

13. An apparatus as claimed in claim 7 further comprising a burner disposed along said axis in said centrifugal separator.

14. An apparatus as claimed in claim 7, characterized by an inlet for gas being arranged tangentially on the periphery of the centrifugal separator.

15. An apparatus as claimed in claim 7, characterized by the centrifugal separator being a flow-through cyclone.

16. An apparatus as claimed in claim 15, characterized by an outlet for particulate material being arranged on the bottom of the flow-through cyclone.

* * * * *